Patented Sept. 2, 1947

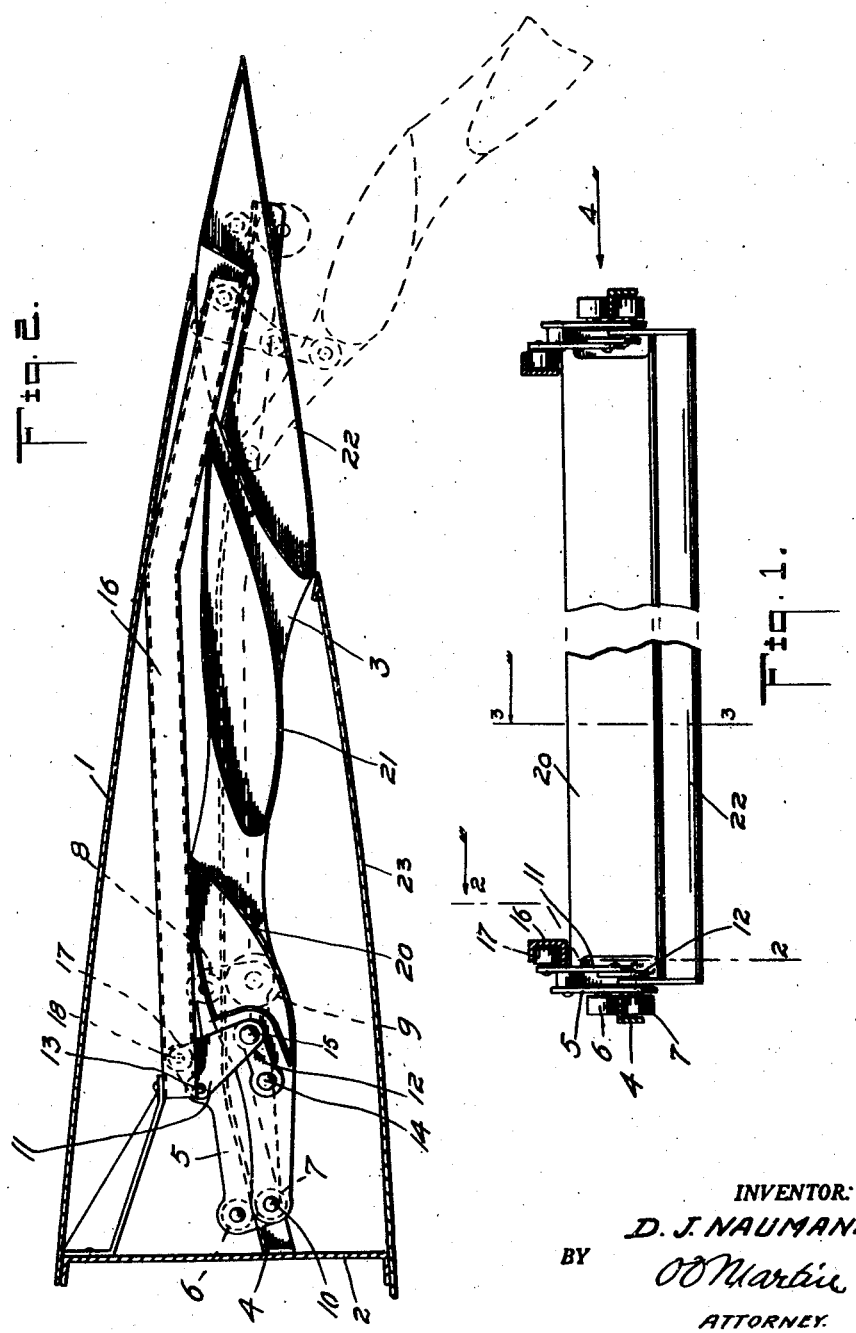

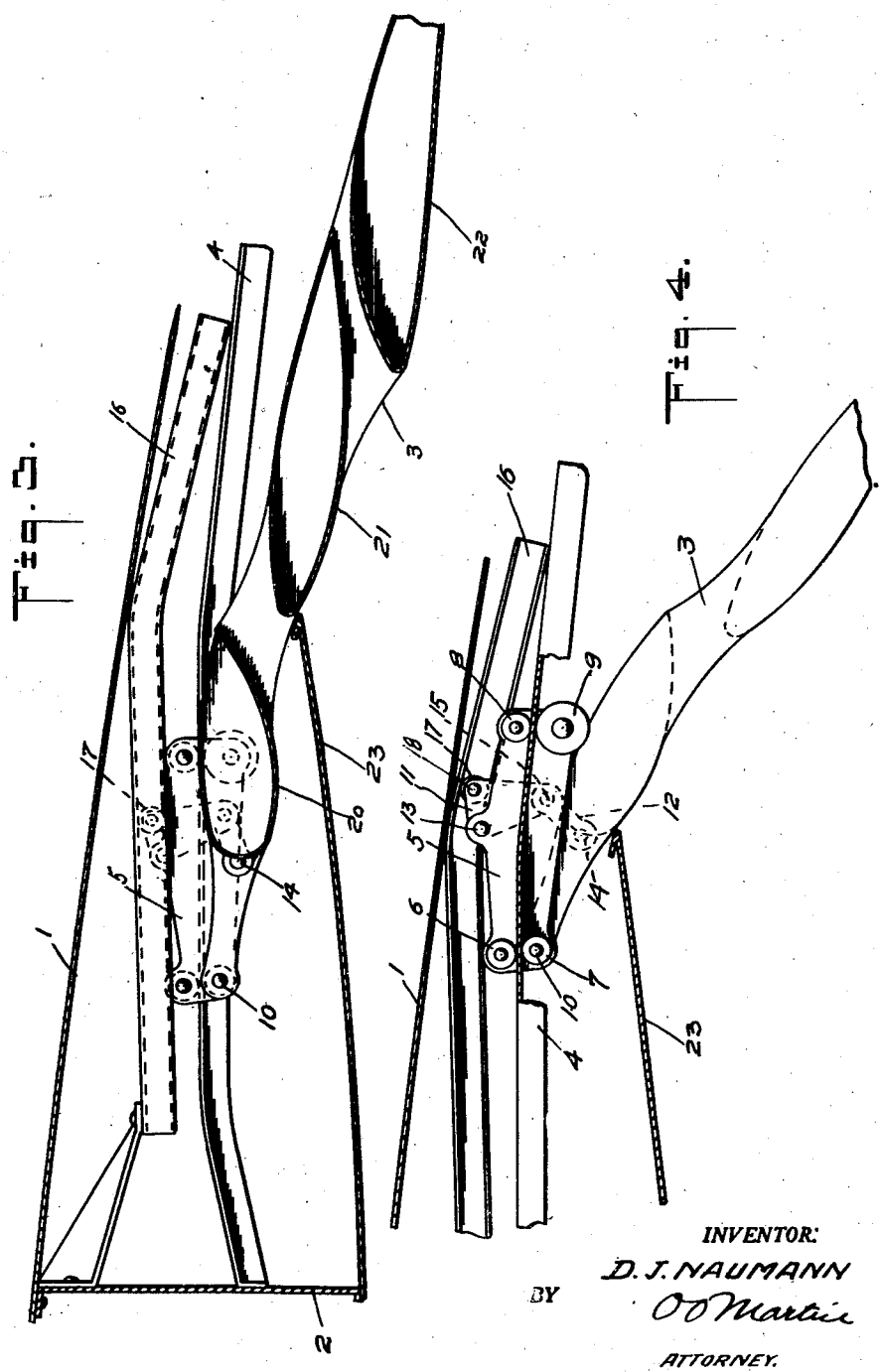

2,426,785

UNITED STATES PATENT OFFICE

2,426,785

VARIABLE AIRFOIL

Donald J. Naumann, South Gate, Calif.

Application July 3, 1943, Serial No. 493,359½

3 Claims. (Cl. 244—42)

1

The present invention relates to airplanes and has particular reference to improvements in airplane wings or other airfoil in which provision is made for quickly and positively adjusting the lift coefficient for changing flight conditions encountered in taking off, maneuvering, and in landing.

One of the principal objects of my invention is to provide airplane wings and other airfoils with a flap comprising a plurality of rigidly interconnected sections which are movable out of a chamber within such wing or airfoil to various desired positions, thereby to increase the curvature and area of the combined airfoil, whereby the lifting power is materially increased and the efficiency is higher than in present day airfoil construction. The movement of the flap is arranged so that any desired number of sections thereof may be exposed to the airflow so as to increase the lift coefficient the desired amount while the unexposed flap sections remain within the chamber so as not to add to the drag coefficient, the icing hazard, or to cause irregularities in the airflow.

A further object is the provision of a flap the sections of which are so positioned with respect to each other as to form a gap between each two adjoining sections, and they are so constructed and mounted that they may be moved rearward from and inclined downward with respect to the wing so as to be exposed to the airflow. The number of sections moved rearwardly and downwardly depends upon the lift coefficient desired. Another important object is to so arrange the flap sections that the gap between the most forwardly exposed section and the most rearwardly concealed section is directly under the trailing edge of the wing in order to provide a gap between the leading edge of said exposed flap section and the trailing edge of the wing. A still further object is the provision of a variable airfoil combination in which the opening of the chamber within the wing is entirely closed at the bottom by the flap, not only when the latter is fully retracted within the chamber, but also when in the various positions of partial extension therefrom required to adjust the lift coefficient to suit changing flight conditions.

Still another object is to provide a suitable chamber within the wing for concealing the unexposed sections of the flap without substantially changing or disturbing the original shape and structure of the wing. This is done in order to substantially reduce head resistance, to eliminate air disturbances forwardly of the flap surfaces

2 which would adversely affect the flow of air through the gaps and over the flap sections, thereby to decrease their lifting power. Also in order to provide protection against icing conditions, where ice would otherwise form on an irregular surface. A further important feature of my invention is that the lower surface of the wing or airfoil is continuous and uninterrupted, even when the flap is in its various positions of partial extension to fair into the gap provided when the flap is in any one of said intermediate positions, as used in the fast maneuvering conditions of flight where a minimum of drag is desirable.

With these and other objects in view, the invention resides in the combinations hereinafter fully described and particularly defined in the claims hereto appended. And a preferred form of the invention is illustrated in the accompanying drawings, of which:

Fig. 1 is a rear view of an airfoil flap combination embodying the invention, substantially as it would appear when removed from the supporting wing or airfoil;

Fig. 2 is a substantially corresponding view of the flap combination housed within the trailing portion of an airplane wing, and taken on line 2—2 of Fig. 1;

Fig. 3 is a similar view taken on line 3—3 of Fig. 1 and showing the flap combination moved into its first position of extension; and Fig. 4 indicates similarly the second position of partial extension of the flap combination.

The structure of my invention is shown embodied in a rectangular wing, within the rear or trailing portion of one side of which is formed a chamber 1, and this chamber is shown closed at the front by a spar 2. A flap is, in Fig. 2, shown housed within this wing chamber, and it is mounted to travel along a beam forming a track 4, which latter extends from the spar 2 beyond the trailing edge of the upper wall of the wing.

It is accepted practice in devices of the character herein described to extend the flap substantially the full length of the wing, on each side of the fuselage, and a track 4 is, for this reason, provided at each end of the flap, substantially as indicated in Fig. 1. A truck 5 is fitted with guide rollers 6, 7 and 8, 9, all of which ride on the track 4 to control the direction of movement of the truck.

An end plate 3, at each end of the flap, serves to combine the various flap sections, and it is pivotally secured to the truck 5 by means of a bolt or rivet 10. The angular relation of this plate to the truck is controlled by links 11, 12, the former of which is journaled at one end on the truck frame at 13. The other link is pivotally mounted on the end plate 3 at 14, and the two links are journaled together at 15. Above the track 4 is rigidly mounted a channeled beam 16, within which a guide wheel 17 is fitted to ride, and the latter is hung to rotate on a stud 18 of the link 11, thereby to control swinging movement of the flap on the truck pivot 10.

Various means have been introduced for moving a flap on tracks to extend the flap to definite positions beyond the trailing edge of the wing. Some designers have rigged up cables hung on pulleys and extending from the flap to the pilot's station; others have proposed the employment of levers for this purpose. But as such operating means forms no part of the present invention, no particular type of mechanism is advocated, and none is illustrated in the drawings.

The flap as illustrated comprises three sections 20, 21 and 22, all rigidly interconnected by means of the end plates 3. And it is important to note that both the top and bottom surfaces of the rearmost section 22, in the position of Fig. 2, form an unbroken continuation of the upper and lower walls of the wing. This is most important during normal flight, where no flap extension is required and it is essential that no projections or breaks in the surfaces are present to disturb or interrupt the airflow across the wing.

In Fig. 3, the flap is shown rearwardly extended until the bottom surface of the section 21 forms an unbroken continuation of the lower wing wall 23. And in the still further extended position of Fig. 4, it is noticed that the flap section 20 also forms an unbroken extension of the lower wing wall. From this, it is seen that the chamber 1 is closed at the bottom at all three positions of the flap, so that no air disturbances can be set up within and through the chamber to interfere with the airflow and so to lower the efficiency of the wing and flap combination. The forming of ice within the chamber is thereby also prevented. It is only during particular flight conditions that air gaps at the trailing edge of the wing are required, and even then it is essential that such airgaps hold definite, predetermined angular and voluminal relation to the lower wing surface. Further to increase the efficiency of this arrangement, it is noticed that the air gaps are Venturi-shaped, and this is also an important improvement.

The above described flap combination is designed for use on high power, high speed planes where changes in the lift and drag coefficient must be quickly effected. By proper manipulation of the flap combination described, any desired amount of lift or drag may be quickly and positively obtained, and this is particularly important where it is necessary to take off or land on fields of limited length. In low powered planes, on the other hand, it may be preferable to provide a flap comprising only two sections having only a single gap therebetween. Or, in extreme cases, it may be found advantageous to combine all three sections into a one-piece flap by filling in the gaps between the sections. As the work involved in effecting such changes is merely mechanical, well within the purview of the designer conversant with the art, it is not thought necessary to burden the specification with additional drawings. Such two section or single piece flap combination may be found particularly useful in slow speed planes, such as transport gliders, where greater increase of drag in proportion to lift is required.

It is in order to attain the various positions of flap extension, maintaining always a closed and unbroken surface along the bottom of the wing as well as the proper angle of inclination of the extended flap that the additional track 16, together with the guide wheel 17 riding therein and the links 11, 12 are provided. It is also in this connection important to note the relative positions and shapes of the two tracks. Of these, the track 4 is shown first rising rearwardly to a position intermediate the truck wheels, when the flap is in its fully retracted position of Fig. 2, whereupon the track continues substantially on the center line of the wing for about two thirds of its length. From this point, it extends rearward and downward to a point somewhat beyond the trailing edge of the upper wall of the wing.

The channeled beam 16 extends rearward substantially parallel with the intermediate portion of the track 4, or slightly rising therefrom, for about two thirds of its length, whereupon it continues rearward and downward until it reaches a point horizontally substantially in line with the upper surface of the track 4. In other words, the initial rearward movement causes the flap to dip slightly and it continues in this angular relation to the wing until, as indicated in the position of Fig. 4, it commences to swing downward sharply in order quickly to increase the lift coefficient.

For the sake of simplicity, the track 4 and beam 16 are merely shown anchored to the wing spar 2, but it will of course be understood that additional fastening devices must be provided in order rigidly to support these parts, particularly at or near the rear end thereof.

By means of the link connections between the flap and the trucks, in combination with the track 4, controlling the directional movement of the trucks, and the roller 17 in the guide 16, I have produced the proper direction of movement of the flap. In doing this, the shape of the wing, when the flap is fully retracted, is not disturbed. Also that, in the various positions of intermediate flap extension, the flap section at the trailing edge of the wing functions as an unbroken continuation thereof in the proper angular relation thereto required for particular flight conditions.

While in the foregoing the important features of my invention have been fully explained and a preferred form of the invention is illustrated, I do not wish to be limited to the exact proportions or combinations of details, but reserve the right to embody such modifications as will come within the scope of the claims hereto appended.

I claim:

1. In combination with an airfoil having a chamber at and forwardly of its trailing edge and an extensible flap normally seated within the chamber for movement out of said chamber, a track seated within said chamber, a truck mounted to ride upon the track, the flap pivotally hung from said truck for angular rotation about said pivot, a bellcrank and a link comprising a toggle joint interconnecting the flap to the truck for controlling the said angular rotation of the flap about the pivot, a guide follower attached to the bellcrank, said guide follower being at spaced relationship to the bellcrank fulcrum, a guide track seated within the chamber, the guide follower mounted to ride upon the guide track, said guide track being adapted to rotate the bellcrank whereby to operate the toggle joint so as to control the angular rotation of the flap with respect to the airfoil as the flap is moved out of the chamber, and means for moving the flap along the track causing the flap to assume an inclined position and spaced from the airfoil and causing the bellcrank and link comprising the toggle joint to assume substantially the position where force applied to said guide follower increases the force indefinitely for the said control of the angular rotation of the flap about the pivot.

2. In combination with an airfoil having a movable flap normally retracted within the airfoil profile, a track comprising rails seated within said airfoil profile, roller trucks mounted to ride upon said rails, said flap pivotally hung from the trucks for angular rotation about said pivots, a bellcrank and a link comprising a toggle joint interconnecting the flap to a truck for controling the said angular rotation of the flap about the pivots, said link pivotally interconnecting an arm of the bellcrank and the flap, a roller guide attached to the other arm of the bellcrank, the fulcrum of the bellcrank pivoted to the truck, the roller guide and the link pivotal connection at spaced relationship on the bellcrank, said roller guide mounted to ride upon a guide rail for controlling the angular relationship of the flap with respect to the airfoil as the flap is moved out of the airfoil profile, and means for moving the flap along the track causing the flap to assume an inclined position and spaced from the airfoil and causing the toggle joint to assume substantially the position where force applied to the roller guide increases the force indefinitely for the control of the flap about the pivot.

3. An airfoil having a chamber extending forwardly from its trailing edge, a flap normally seated within said chamber for movement out of said chamber to an inclined position and spaced from the airfoil, a track comprising rails seated within said chamber, roller trucks mounted to ride upon said rails, said flap pivotally hung from said trucks for angular rotation about said pivots, a set of links pivotally interconnecting the flap to a truck for controlling said angular rotation of the flap about said pivots, a roller guide attached to said set of links mounted to ride upon a guide rail for controlling the angular relation of the flap with respect to the airfoil as the flap is moved out of the airfoil, and means for moving the flap along said track causing the flap to assume an inclined position and spaced from the airfoil and causing said links pivotally interconnecting the flap to a truck to align themselves in substantially a straight line.

DONALD J. NAUMANN.

REFERENCES CITED

The following references are of record in the file of this patent:

UNITED STATES PATENTS

| Number | Name | Date |
| --- | --- | --- |
| 2,273,881 | Naumann | Feb. 24, 1942 |
| 2,202,430 | Rebeski | May 28, 1940 |
| 2,348,150 | Richter | May 2, 1944 |
| 2,137,879 | Ksoll | Nov. 22, 1938 |
| 2,222,915 | Rebeski | Nov. 26, 1940 |
| 1,854,444 | Barnhart | Apr. 19, 1932 |

FOREIGN PATENTS

| Number | Country | Date |
| --- | --- | --- |
| 519,236 | Great Britain | Mar. 20, 1940 |